United States Patent [19]

Braun

[11] 4,291,217

[45] Sep. 22, 1981

[54] PROCESS FOR UNDERWATER PLASMA CUTTING OF WORKPIECES

[75] Inventor: Werner Braun, Munich, Fed. Rep. of Germany

[73] Assignee: Messer Griesheim, Frankfurt am Main, Fed. Rep. of Germany

[21] Appl. No.: 66,638

[22] Filed: Aug. 14, 1979

[30] Foreign Application Priority Data

Sep. 30, 1978 [DE] Fed. Rep. of Germany ....... 2842693

[51] Int. Cl.$^3$ ............................ B23K 9/00; B23K 9/16
[52] U.S. Cl. ..................... 219/121 PH; 219/121 PQ; 219/121 PU; 219/137 R; 219/75
[58] Field of Search ............... 219/121 P, 137 R, 74, 219/75, 76.16; 313/213.3, 213.4, 213.5

[56] References Cited

U.S. PATENT DOCUMENTS

| | | | |
|---|---|---|---|
| 2,806,124 | 9/1957 | Gage | 219/75 X |
| 2,906,858 | 9/1959 | Morton, Jr. | 219/121 P |
| 3,204,076 | 8/1965 | Browning | 219/121 P |
| 3,534,388 | 10/1970 | Takakiyo et al. | 219/121 P |
| 3,567,898 | 3/1971 | Fein | 219/121 P |
| 3,619,549 | 11/1971 | Hogan | 219/121 P |
| 3,641,308 | 2/1972 | Couch, Jr. | 219/121 P |
| 3,649,805 | 3/1972 | Rohrberg | 219/121 P |
| 4,058,698 | 11/1977 | Bukhovsky et al. | 219/121 P |

FOREIGN PATENT DOCUMENTS

| | | | |
|---|---|---|---|
| 2019946 | 12/1975 | Fed. Rep. of Germany | 219/121 P |
| 2505665 | 8/1976 | Fed. Rep. of Germany | 219/121 P |
| 86309 | 11/1971 | German Democratic Rep. | 219/121 P |
| 318438 | 12/1971 | U.S.S.R. | 219/121 P |

*Primary Examiner*—Gene Z. Rubinson
*Assistant Examiner*—M. Paschall
*Attorney, Agent, or Firm*—Connolly and Hutz

[57] ABSTRACT

Workpieces, such as structural steel, are cut under water by a plasma burner having a needle electrode with the plasma arc slightly under the water level and the plasma arc being enveloped during the ignition and cutting by a compressed air sheath outside the nozzle which strongly contracts the plasma cutting arc.

1 Claim, 1 Drawing Figure

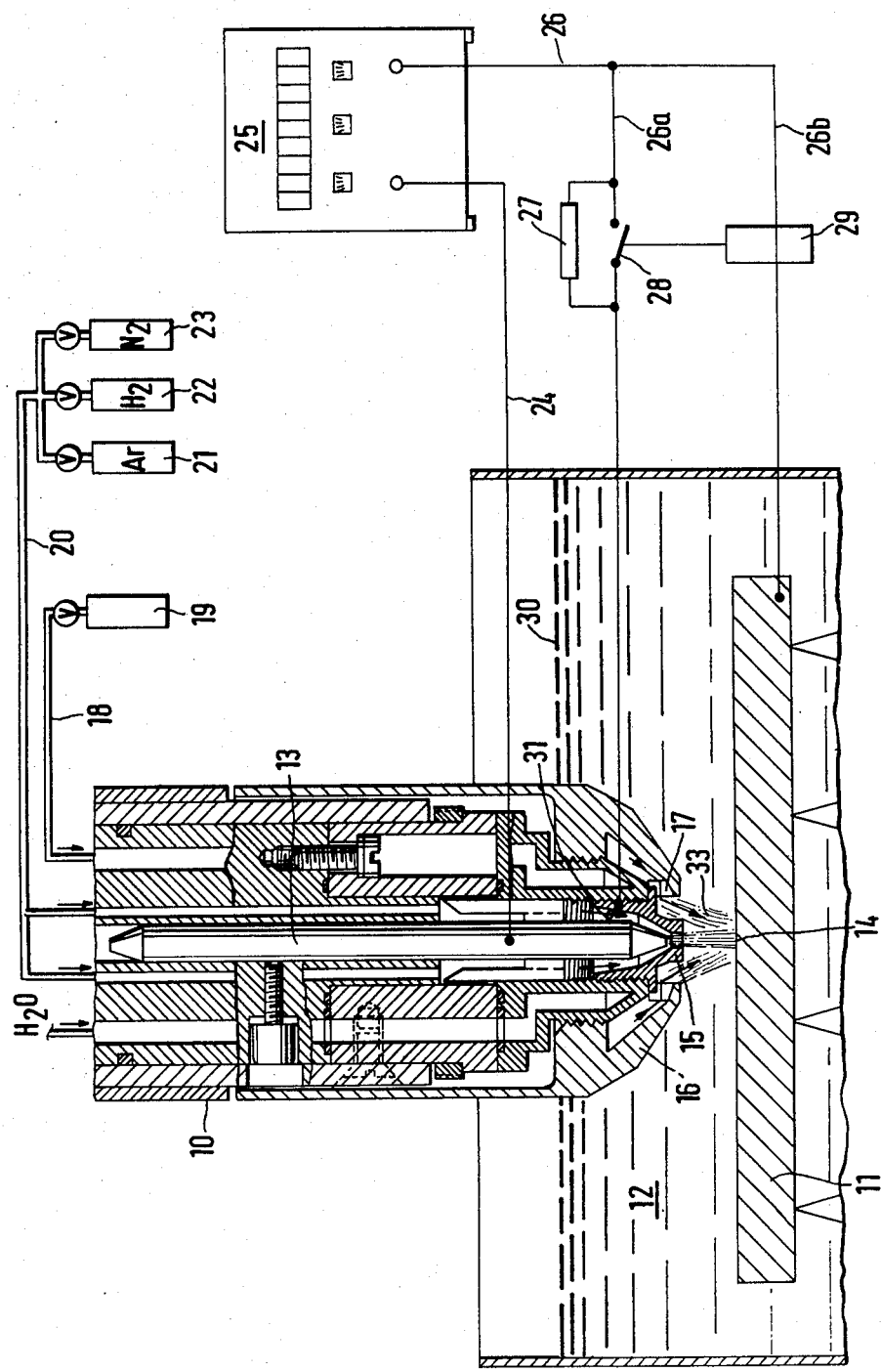

4,291,217

PROCESS FOR UNDERWATER PLASMA CUTTING OF WORKPIECES

BACKGROUND OF INVENTION

The present invention concerns a process for the underwater plasma cutting of workpieces, especially structural steel.

The state of the art is exemplified by U.S. Pat. No. 3,851,864. According to this prior art cutting method, the cutting process is carried out with a plasma burner at a small distance under a liquid level. By carrying out the cutting process in water, the entire cutting process generates less environmental nuisance in terms of noise, dust, gases, etc. The type of plasma burner used is, however, not specified in U.S. Pat. No. 3,851,864.

Another process for avoiding environmentally hazardous components during the plasma cutting or workpieces by means of a plasma burner is also known from German Offenlegungsschrift No. 25 05 665, in which the workpiece and the plasma burner art also submerged in a liquid bath for cutting, so that the cutting process is carried out at a small distance under the liquid level. It is proposed in the German Offlegungsschrift that a plasma cutting burner with a liquid-stabilized, transmitted plasma cutting beam be used, with the plasma cutting gas consisting mainly of nitrogen. Such a burner, as it has become known, for example, from U.S. Pat. No. 3,641,308, has the advantage that as a consequence of the use of nitrogen as a plasma cutting gas, it is possible to cut structural steels burr-free. Due to the flat electrode used with this burner, however, it is necessary to supply a large electrical power, so that the power factor (ratio of continuous power consumption to cutting power) is obtained that is more unfavorable than the power factor than can be reached with a plasma burner having a needle electrode. Plasma cutting burners of this kind with needle electrodes are known from German Pat. No. 20 19 946. These burners are, as noted above, favorable with respect to the power factor, but they operate with mixtures of argon, hydrogen and nitrogen, which is unfavorable for achieving optimally burr-free cuts in structural steel.

There has been a steady desire in industry to reduce the amount of electrical requirements for underwater plasma cutting as well as in other areas, while maintaining the cutting quality already achieved. In view of the above-described state of the art, it would seem logical for the expert that in order to reduce the energy, a plasma burner with a needle electrode and with nozzles strongly contracting the arc, i.e., a plasma burner corresponding to German Pat. No. 20 19 946, should be used also fur underwater plasma cutting. Practice has, however, shown that during the ignition of the plasma cutting arc, and also during plasma cutting proper, uncontrollable and unintended arcs are generated between the contracting nozzle and the workpiece, and a so-called double arc is formed. These double arcs (the arc between the electrode and the nozzle, and the arc between the nozzle and the workpiece) lead to the sudden destruction of the nozzles, so that their life becomes so short that the desired mode of operation (underwater plasma cutting with a plasma burner with needle electrode) is no longer economical. It has also been shown that the burr-free cutting of structural steel under water is also not achieved with these burners and the plasma gases (argon, hydrogen and nitrogen mixture).

SUMMARY OF INVENTION

In view of the above-described state of the art and the experience gained, it is the object of the present invention to create an underwater plasma cutting proces which, utilizing the advantages deriving from a plasma burner with needle electrode and the nozzle which strongly contracts the plasma arc, is free from the above-mentioned disadvantages, especially the formation of double arcs.

To accomplish this object, according to the present invention, the cutting process is carried out at a small distance under the water level with a plasma burner with needle electrode and transmitted plasma cutting arc, and the plasma cutting arc outside of the nozzle which strongly contracts the plasma cutting arc is enveloped in a compressed-air sheath during the ignition of and cutting with the plasma cutting arc. Surprisingly and unforeseeably, it has been found that due to the use of the said compressed-air sheath, undesirable, uncontrollable arcs no longer occur between the nozzle and the workpiece. A possible explanation is seen in that in connection with the high ionization potential of the air having a high flow velocity, the formation of the said double arcs is avoided. It has also been found, surprisingly, that with the process according to the present invention, it is also possible to cut structural steel burr-free underwater; plates with thicknesses ranging from 5 to 60 mm have been preferable cut burr-free in the experiments.

Due to the compressed-air sheath proposed according to the present invention, which has surprising effects, it is now possible to utilize the advantages of a burner with needle electrode and a nozzle which strongly contracts the plasma cutting arc also in the case of underwater plasma cutting, among which advantages the favorable power factor should be mentioned especially. Thus, the process according to the present invention has made possible underwater plasma cutting, which is economical with respect to the electrical energy utilized, and with which structural steel can also be cut burr-free.

In an example of a modified version of the present invention, it is proposed that the flow velocity of the compressed-air sheath be in the range of 3,000 to 15,000 mm/minute. With flow velocities in this range, the absence of double arcs can also be guaranteed.

Concerning the power factor, it is proposed that the plasma cutting arc be contracted by the contracting nozzle so that the current density (ratio of the plasma cutting current to the area of the nozzle hole) is in the range of 50 to 80 A/mm$^2$. An especially advantageous device for carrying out the process with a plasma cutting burner with needle electrode and contracting nozzle according to the present invention is characterized in that the nozzle is surrounded by a cap in the intake zone, and the said cap has discharge openings to generate the compressed-air sheath around the cutting beam.

THE DRAWINGS

The single FIGURE schematically shows in cross section a device in accordance with the invention.

DETAILED DESCRIPTION

The drawing shows a plasma burner designated as a whole by 10, whose tip, as well as a workpiece 11, are immersed in a liquid bath, preferably a water bath 12, so that the cutting process can be carried out at a small distance (5 to 15 mm). The plasma cutting burner 10 is equipped as a burner with a needle electrode 13 and a nozzle 15 which strongly contracts the plasma cutting arc, and its construction is essentially the same as that of the burner according to German Pat. No. 20 19 946, the details of which are incorporated herein by reference thereto. At variance from this known burner, in the burner according to the present application, the nozzle 15 is surrounded by a cap 16 in the discharge zone. In the cap 16 there are gas discharge openings 17. The discharge openings 17 are distributed evenly around the nozzle 15, and are connected with canals in the burner (not shown in detail), whose outlet is connected with a compressed-air supply source 19 via a pipe 18. The plasma cutting gas is supplied to the burner 10 via the pipes 20 from the supply sources 21, 22 and 23, wherein the gas supply source 21 supplied argon, the supply soure 22 hydrogen, and the supply source 23 nitrogen. The optimal gas mixture is delivered to the pipe 20 via the mixing devices (not shown) from the sources 21, 22 and 23. As is further seen in the drawing, the electrode 13 is connected via the current conductor 24 with one pole of a power source 25 whose other pole is connected with both the nozzle 15 and the workpiece 11 via a branched conductor 26. In the branch 26a there is a pilot arc current-limiting resistor 27, which is preferably by-passed by a contact 28 during the ignition of the main arc, and which is opened again by a relay 29 after the ignition of the main arc. Through this by-passing of the resistor 27 it is achieved in an advantageous manner that the switch-on peak forming during the switching on the power source does not lead to double arc formation.

With the above-described device, the process according to the present invention can be carried out in an especially simple fashion, in that for cutting the workpiece 11, which may be, for example, made of structural steel, the workpiece 11 and the plasma burner are placed at a small distance below the water level 30, and the cutting process accordingly takes place under water. By means of a high-frequency discharge (not shown), a pilot arc 31 is first ignited, which ionizes the plasma cutting gaseous mixture, and then the plasma cutting arc 14 is formed between the electrode 13 and the workpiece 11. This cutting arc 14 is supplied with electrical energy from the power source 25 via the conductor 24 and the conductor 26b. According to the invention, the cutting beam 14 is enveloped by a compressed-air sheath 33 during the cutting, whereby double arcs are avoided, and burr-free plasma cuts are obtained in structural steel.

The parameters of plasma cuts performed by the process according to the present invention are shown in the Table below, with the cutting process being carried out with the above-described cutting burner in a range less than 30 cm under the liquid level.

| Material | Carbon Steel (structural steel) | | | Cr | Ni |
|---|---|---|---|---|---|
| Plate thickness mm | 20 | 40 | 80 | 10 | 20 |
| Electrical cutting power KW | 32 | 35 | 75 | 30 | 32 |
| Nozzle diameter mm | 2.5 | 2.5 | 4.5 | 2.5 | 2.5 |
| Cutting current A | 250 | 250 | 500 | 250 | 250 |
| Cutting voltage V | 130 | 140 | 150 | 120 | 130 |
| Cutting gas | Ar, $H_2$, $N_2$ - | | | Ar, $H_2$, $N_2$ | |
| Cutting gas pressure bar | 6 | | | 6 | |
| Cutting gas flow rate l/min | Ar 20, $H_2$ 12, $N_2$15 | | | Ar 20, $H_2$12 $N_2$ 15 | |
| Compressed air pressure bar | 6 | | | 6 | |
| Compressed air flow rate l/min | 40 | | | 40 | |
| Compressed air velocity m/min | approx. 12,000 | | | approx. 12,000 | |
| Cutting speed m/min | 1.2 | 0.5 | 0.2 | 2.5 | 1.3 |

What is claimed is:

1. In a process for the underwater plasma cutting of workpieces such as structural steel, the improvement being carrying out the cutting process with a plasma burner having a needle electrode and transmitted plasma arc at small distances under the water level, and enveloping the plasma cutting arc during the ignition cutting by a compressed-air sheath solely outside of the nozzle which strongly contracts the plasma cutting arc, flowing the compressed-air sheath at a velocity in the range of 3,000 to 15,000 m/minute, utilizing a current density in the range of 50 to 80 A/mm$^2$, and directing the compressed-air sheath to the area of the cut by flowing the compressed air from slots in the nozzle located close to the discharge opening of the nozzle.

* * * * *